(12) United States Patent
Klammer et al.

(10) Patent No.: US 12,397,490 B2
(45) Date of Patent: Aug. 26, 2025

(54) PLASTICIZING UNIT FOR A MOLDING MACHINE

(71) Applicant: ENGEL AUSTRIA GmbH, Schwertberg (AT)

(72) Inventors: Guenther Klammer, Aschbach Markt (AT); Thomas Koepplmayr, Marchtrenk (AT); Raffael Johannes Rathner, Scharnstein (AT); Klaus Fellner, Steyr (AT)

(73) Assignee: ENGEL AUSTRIA GMBH, Schwertberg (AT)

( * ) Notice: Subject to any disclaimer, the term of this patent is extended or adjusted under 35 U.S.C. 154(b) by 95 days.

(21) Appl. No.: 18/214,882

(22) Filed: Jun. 27, 2023

(65) Prior Publication Data

US 2024/0083088 A1    Mar. 14, 2024

(30) Foreign Application Priority Data

Jul. 11, 2022  (AT) .............. A 50510/2022

(51) Int. Cl.
*B29C 48/694*    (2019.01)
*B29C 45/00*     (2006.01)
*B29C 45/50*     (2006.01)
*B29C 45/58*     (2006.01)
*B29C 45/60*     (2006.01)

(52) U.S. Cl.
CPC ...... *B29C 48/6945* (2019.02); *B29C 45/0046* (2013.01); *B29C 45/50* (2013.01); *B29C 45/58* (2013.01); *B29C 45/60* (2013.01)

(58) Field of Classification Search
CPC .................... B29C 48/6945; B29C 45/50
See application file for complete search history.

(56) References Cited

U.S. PATENT DOCUMENTS

| | | | |
|---|---|---|---|
| 5,246,660 A | 9/1993 | Tsutsumi | |
| 6,168,411 B1 | 1/2001 | Wildman | |
| 6,270,703 B1 | 8/2001 | Wildman et al. | |
| 6,607,299 B1 * | 8/2003 | Bacher | B29C 48/6916 366/89 |
| 10,828,815 B2 | 11/2020 | Halter et al. | |
| 2017/0368730 A1 | 12/2017 | Halter et al. | |

FOREIGN PATENT DOCUMENTS

| | | | |
|---|---|---|---|
| DE | 25 24 746 | 12/1976 | |
| DE | 691 10 269 | 2/1996 | |
| WO | WO-2006045126 A1 * | 5/2006 | ........ B01D 29/356 |
| WO | 2016/095022 | 6/2016 | |

OTHER PUBLICATIONS

Machine translation DE2524746A1 (Year: 1976).*
Machine translation WO2006045236A1 (Year: 2006).*
Machine translation DE69110269T2 (Year: 1996).*

* cited by examiner

*Primary Examiner* — Abbas Rashid
*Assistant Examiner* — Wayne K. Swier
(74) *Attorney, Agent, or Firm* — Wenderoth, Lind & Ponack, L.L.P.

(57) ABSTRACT

A plasticizing unit for a molding machine includes an injection cylinder and an axially movable plasticizing screw arranged in the injection cylinder. A filter device for filtering plasticized material, in particular plasticized plastic, is provided, and the filter device is or can be arranged axially movable in the injection cylinder.

16 Claims, 6 Drawing Sheets

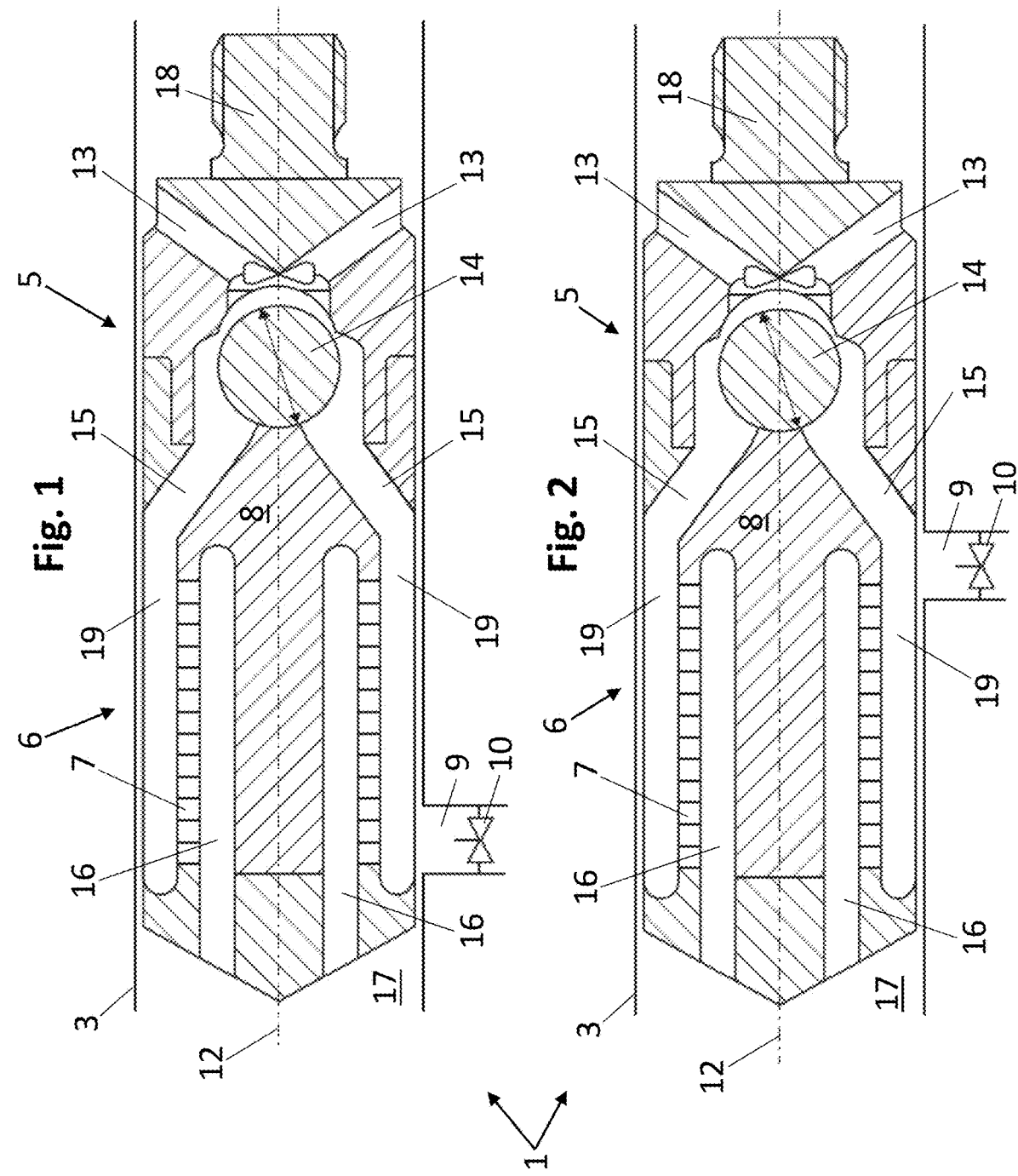

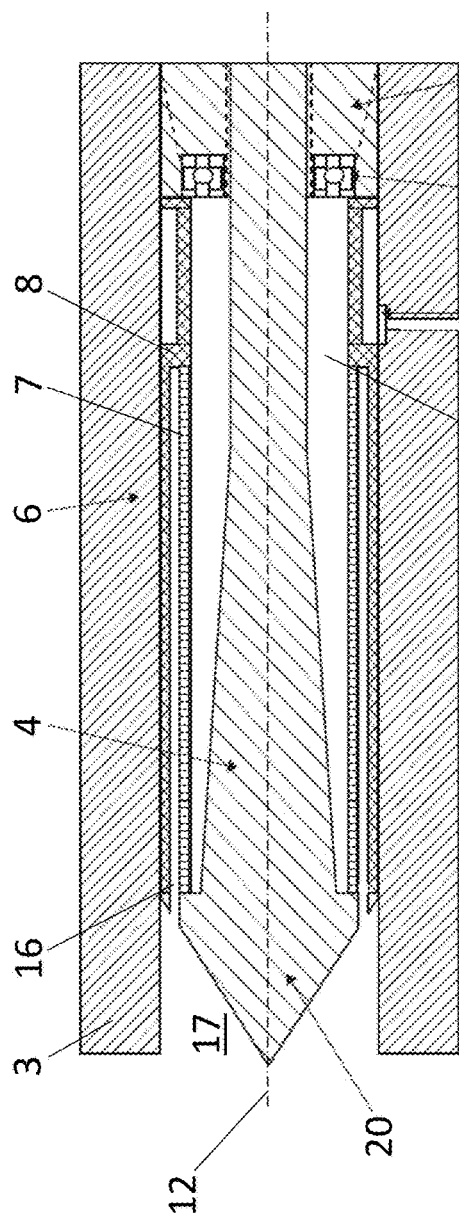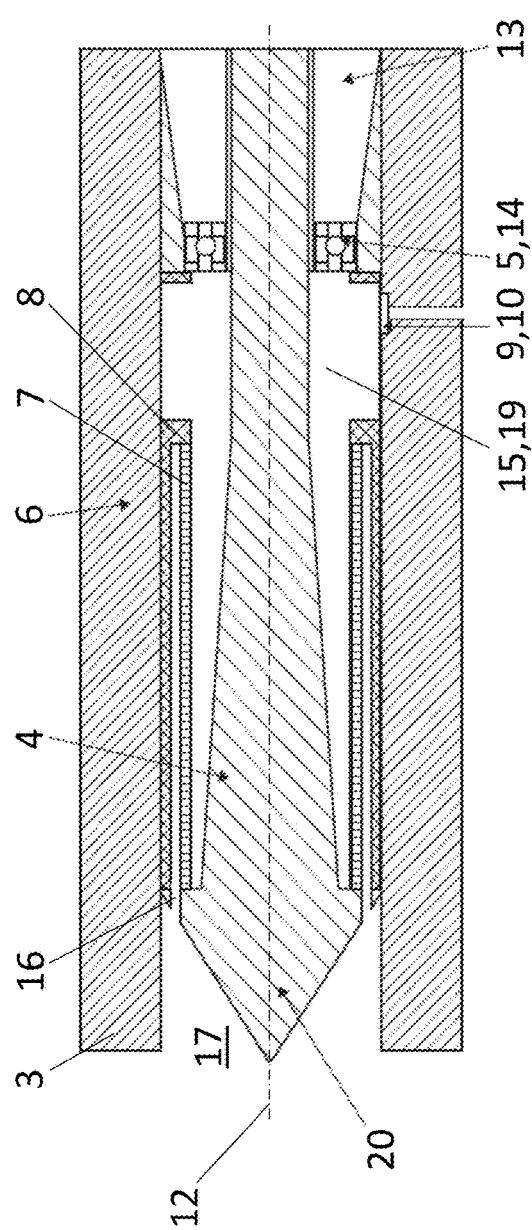

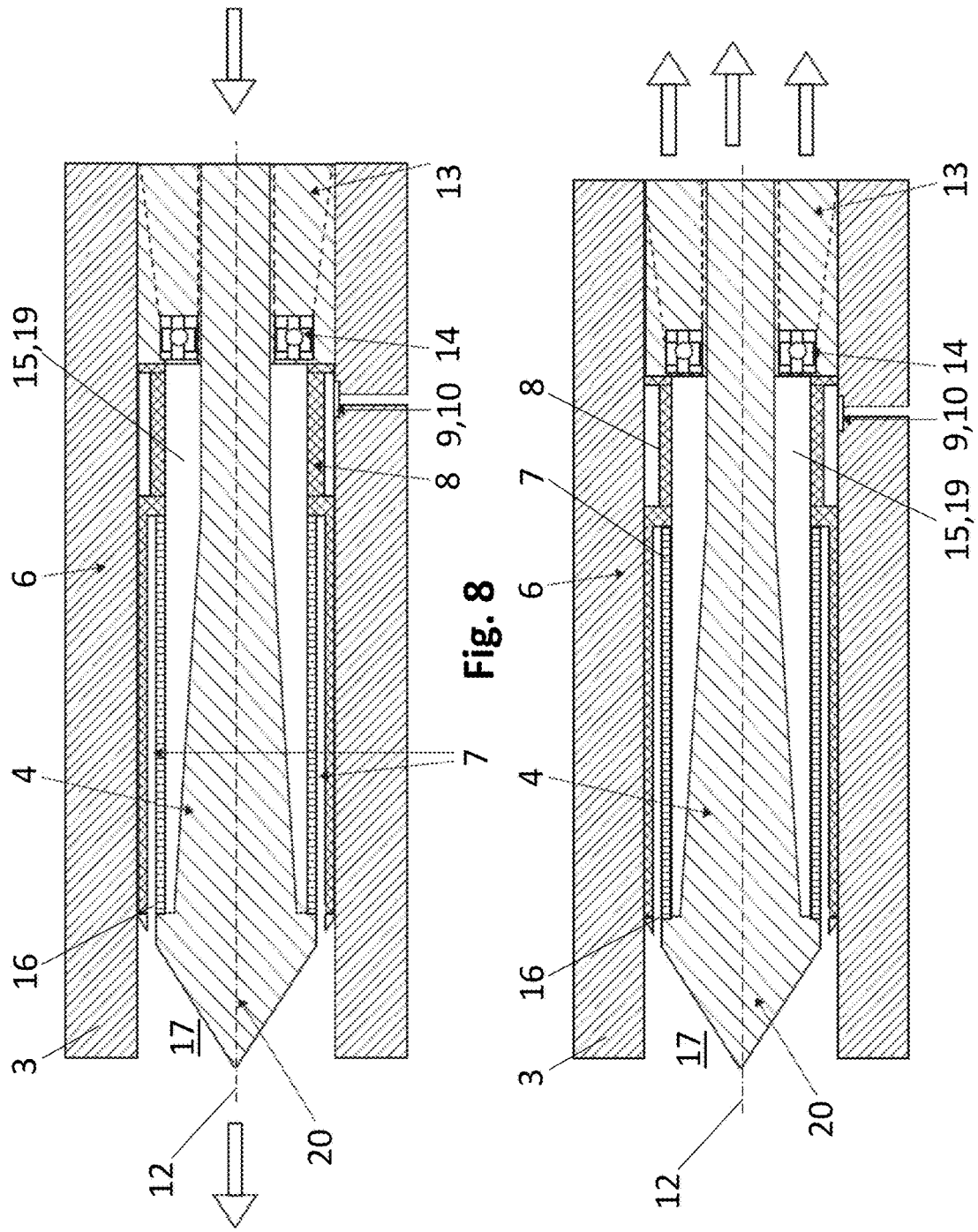

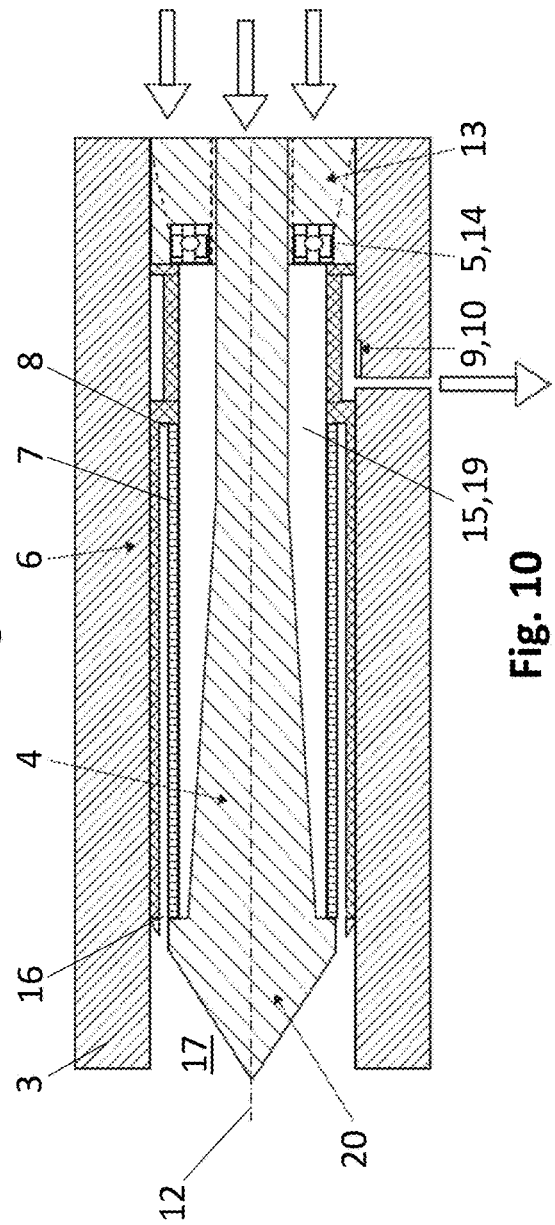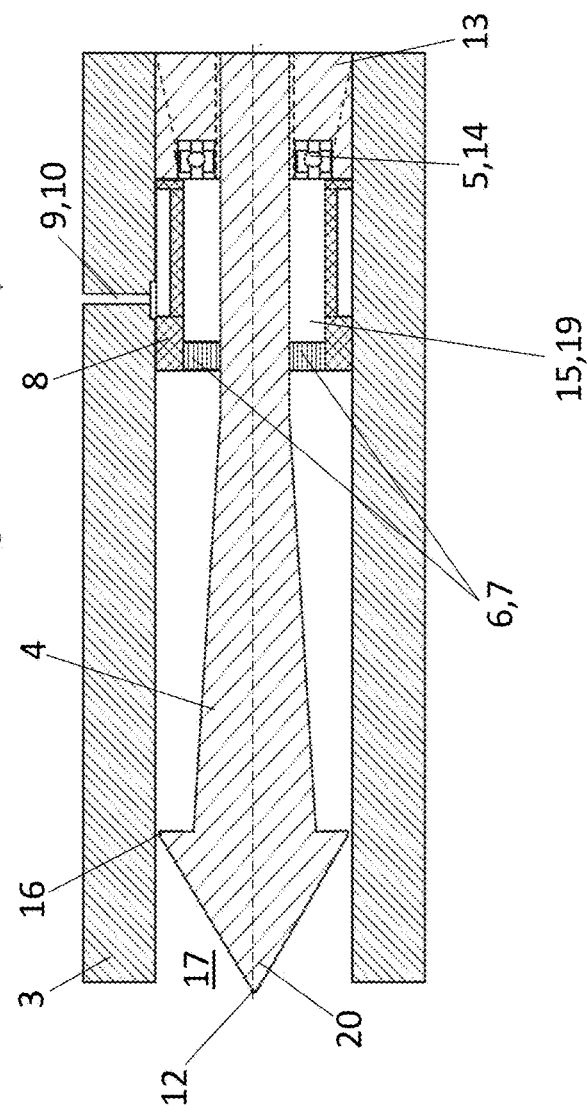

PLASTICIZING UNIT FOR A MOLDING MACHINE

BACKGROUND OF THE INVENTION

The present invention relates to a plasticizing unit for a molding machine, a molding machine with such a plasticizing unit, and a method for operating a plasticizing unit.

By molding machines may be meant injection-molding machines, transfer-molding machines, presses and the like. Molding machines in which the plasticized material is supplied to an open mold are also entirely conceivable.

The state of the art is to be outlined below with reference to an injection-molding machine. This applies analogously to molding machines in general.

Generic plasticizing units for injection-molding machines comprise an injection cylinder and an axially movable plasticizing screw arranged in the injection cylinder, as well as a backflow barrier connected to the plasticizing screw in a movement-locking manner.

Corresponding plasticizing units are used in injection-molding machines to plasticize a plasticizable material through a rotational movement of the plasticizing screw, wherein the plasticized material is plasticized due to the shear movement, shear heat and optionally externally supplied heat energy. This generally takes place in the plasticizing zone of the plasticizing unit.

After the material to be plasticized has been plasticized, the plasticized material is collected in a space in front of the screw at the tip of the plasticizing screw, wherein through an axial movement of the plasticizing screw the plasticized material can be pushed out of the plasticizing unit and injected into a mold cavity of a mold, where the plasticized material can in turn cure (and can thus solidify, for example, to form a finished product, molded part or semi-finished product).

It is known from the state of the art to process contaminated plastics as material to be plasticized. These plastics can be, for example, recyclates, material to be ground or agglomerates, which are used for example in a recycling or compounding application.

This topic is becoming ever more important, wherein through the recycling of materials to be plasticized (for example thermoplastics), the materials can be supplied for a new use or a new area of application and thus a marked advantage is created with respect to environmental friendliness.

However, in order to be able to use such recycled materials in an injection-molding process, it is necessary to purify them, wherein the contaminants are to be removed from the material to be plasticized.

For this purification or prepurification of the materials to be plasticized, it is known that, in a first step, the contaminated material is plasticized by a continuously operating plasticizing unit and is then purified by degassing processes and filter systems.

After filtration and degassing, the plasticized material is cooled again and solidifies, wherein the purified material is usually brought directly into a form that is easy to process further, such as for example granules.

The granules produced from purified and degassed recycled material can then be used subsequently by an injection-molding process in an injection-molding machine.

However, it has proved to be disadvantageous here that a relatively high expenditure of energy and effort is necessary for the purification of this material and for the preparation of the material for an injection-molding process.

SUMMARY OF THE INVENTION

The object of the present invention is therefore to provide a plasticizing unit and/or a plasticizing method in which the disadvantages of the state of the art are at least in part improved and/or a more energy-efficient recycling of plasticizable material can be implemented and/or a more energy-efficient purification of material to be plasticized is possible and/or a direct processing of material to be purified and plasticized is made possible and/or a more continuous, rapid or energy-saving possibility for plasticizing material to be plasticized is presented.

This object is achieved according to the invention by a plasticizing unit for a molding machine as described below, a molding machine with such a plasticizing unit, as well as a method for operating a plasticizing unit with the features described below.

According to the invention, a plasticizing unit for a molding machine has an injection cylinder, and an axially movable plasticizing screw is arranged in the injection cylinder. A filter device for filtering plasticized material, in particular plasticized plastic, is provided, which is or can be arranged axially movable in the injection cylinder.

The provision of a filter device for filtering plasticized material in the injection cylinder can make it possible also to use contaminated materials in a process in a molding machine, in particular an injection-molding machine. The contaminated material is plasticized via the plasticizing screw of the molding machine, and is filtered via the filter device arranged in the injection cylinder, in order to clean the contaminated plasticized material of contaminants.

This procedure has the substantial advantage over the state of the art that a recycled material has to be plasticized only once and need not be purified separately, which represents a much higher energy efficiency during the processing.

A further advantage is created to the effect that plasticizing units known from the state of the art with plasticizing screws can be utilized, whereby a very compact design of the plasticizing unit can be realized even in the case of processing of contaminated materials. In other words, depending on the embodiment present, for example, only the plasticizing screw has to be modified in order to be able to carry out a filtration.

A fundamental aspect of the invention is that the plasticizing screw can be used as actuator for the filtration due to the axial mobility of the filter device, for example in order to carry out the filtration under certain pressure or volume flow conditions or in order to be able to carry out a backflushing.

Through the filtering of the plasticized material directly in the molding process, the steps described at the beginning (such as for example the production of granules) can be omitted, which obviously represents a significant improvement in terms of complexity and economic efficiency.

A corresponding application of an embodiment variant of the present invention can thus also make a recycling or compounding application considerably more attractive to a user, wherein the production costs and the production effort are minimized, whereby the environmental friendliness can be increased (through increased use).

A plasticizing unit according to the invention can have precisely one plasticizing screw or also be formed as a twin-screw design or multi-screw design. In the following description, the plasticizing screw (singular) is sometimes mentioned. However, this is to be understood such that analogous embodiments with several plasticizing screws are likewise applicable.

Of course, in embodiments with several plasticizing screws, several screw axes are present, with respect to which the plasticizing screw is movable in each case axially and in a rotating manner.

As mentioned, a device according to the invention can be used in already known variants of the state of the art, as described for example in the introduction to the description, and can be subsequently installed.

By molding machines may be meant injection-molding machines, transfer-molding machines, presses and the like. Molding machines in which the plasticized material is supplied to an open mold are also entirely conceivable.

Within the meaning of the present document, by a filtration and/or a filtering of a plasticized material may be meant that foreign substances present in the plasticized material are, preferably mechanically, released, removed, discharged and/or separated at least partially from the plasticized material. This can thus also include separation methods.

The plasticizing unit has a backflow barrier, which is arranged in the injection cylinder and is preferably connected to the plasticizing screw.

Preferably, the filter device is or can be axially and/or rotationally coupled to the plasticizing screw and/or the backflow barrier in a movement-locking manner.

Thus, a material to be plasticized is first of all plasticized by the plasticizing screw and a rotational movement of the plasticizing screw in the injection cylinder due to shearing and shear heat arising, and is conveyed in the direction of a dispensing opening of the plasticizing cylinder. The plasticized material enters the injection cylinder via the backflow barrier, wherein the plasticized material accumulates in the injection cylinder (in the space in front of the screw) and thus forms a melt cushion.

Due to the growing melt cushion. the plasticizing screw is pushed axially backwards, with the result that the space in front of the screw grows.

If the filter device is now coupled to the plasticizing screw and/or the backflow barrier, the material plasticized by the plasticizing screw can be conveyed via the filter device, before it accumulates in the space in front of the screw, whereby the plasticized material can be cleaned of contaminants.

However, the filter device is freestanding and/or connected to the injection cylinder.

The filter device is or can be arranged between plasticizing screw and backflow barrier or on a side of the backflow barrier facing away from the plasticizing screw.

If a large enough melt cushion forms in the space in front of the screw, the plasticized material is conveyed out of the injection cylinder via an outlet opening via a linear movement of the plasticizing screw in the direction of the melt cushion. The result is that the plasticized material leaves the injection cylinder and is for example supplied to a mold of the molding machine.

If this dispensing movement of the plasticizing screw is now carried out, the backflow barrier closes, with the result that the plasticized material cannot flow out of the space in front of the screw back to the plasticizing screw.

If the filter device is now arranged between plasticizing screw and backflow barrier, the filter device can be protected from the prevailing injection pressures which are exerted on the melt cushion during the dispensing movement of the plasticizing screw.

Preferably, the filter device has at least one filter element, preferably a filter ring, which at least partially surrounds the plasticizing screw and/or a backflow barrier.

The filter device can be formed in such a way that the plasticized material penetrates the filter device for filtering in a radial and/or axial direction (with respect to a longitudinal axis of the injection cylinder, the backflow barrier and/or the plasticizing screw).

Preferably, the at least one filter device is or can be arranged in the injection cylinder between the plasticizing screw and a backflow barrier or on a side of the backflow barrier facing away from the plasticizing screw (i.e., at an axial end of the backflow barrier farthest from the plasticizing screw).

At least one backflow barrier can be arranged in the injection cylinder between the plasticizing screw and the filter device.

The filter device can have a carrier which carries at least one filter element of the filter device, and is formed to channel the plasticized material through the at least one filter element.

The carrier can be connected to a backflow barrier and/or formed as part of the backflow barrier.

Through the combination of the carrier with the backflow barrier, a simple and compact implementation of the filter device can be formed. In comparison with the state of the art, there are no appreciable increases in size of a plasticizing unit despite a filter device being provided.

The carrier can have at least one first channel and at least one second channel. The at least one second channel, in comparison with the at least one first channel, lies radially inside in the carrier, and the at least one first channel is connected to the at least one second channel via the filter element.

Preferably, the injection cylinder can have at least one outlet opening in an area of use of the filter device, which outlet opening preferably is or can be connected with respect to a surrounding area of the injection cylinder by a shut-off valve.

At least one actuator for backflushing the at least one filter device can be provided, and plasticized material can be conveyed against the conveying direction of the plasticizing screw during the plasticizing.

Preferably, the at least one actuator is formed by the plasticizing screw itself.

Thus, for example, plasticized material can be conveyed against the normal conveying direction by the at least one actuator, with the result that contamination, blocking or coating of the filter device and/or the at least one filter element can be removed from the filter device by the plasticized material flowing back (such a procedure is also often referred to as backflushing).

During this backflushing, the at least one outlet opening can be opened, with the result that the backflushed, plasticized material, with the contaminants of the filter device, can be discharged from the injection cylinder via the outlet opening.

Particularly preferably, the at least one actuator is formed by the plasticizing screw itself.

Thus, for example, the plasticizing screw can exert a pressure on a melt cushion formed in the space in front of the screw, wherein for example an injection nozzle of the injection cylinder remains closed, with the result that the plasticized material of the melt cushion flows back in the direction of the plasticizing screw and thus backflushes the filter device.

However, designs in which an additional plunger-cylinder unit is provided as actuator for backflushing the filter device are also entirely conceivable.

Preferably, at least one sealing element is provided, which seals the filter device with respect to the injection cylinder, with the result that plasticized plastic passes through the filter device and does not bypass it.

Within the meaning of the present document, by sealing may be meant sealing for a plasticized plastic, wherein a quantity of plasticized plastic that is relative to the process is sealed off against escape. There may nevertheless be a leak occurring due to tolerances, wear and operating conditions.

The filter device can have at least one filter element, which filter element has at least one hole and/or filter structure for filtering the plasticized material.

The at least one hole and/or filter structure of the at least one filter element is preferably formed correspondingly large so that it is possible for the plasticized material to flow through the at least one hole and/or filter structure, but contaminants present in the plasticized material cannot pass through, with the result that these contaminants are deposited on the at least one hole and/or the filter structure.

The backflow barrier (or the backflow barriers) can be ball-type backflow barriers and/or ring-type backflow barriers.

Protection is furthermore sought for a method for operating a plasticizing unit, wherein material is plasticized to form a plasticized material in an injection cylinder and is filtered by a filter device arranged axially movable in the injection cylinder.

BRIEF DESCRIPTION OF THE DRAWINGS

Further advantages and details of the invention will be described below with reference to the drawings, in which:

FIGS. 1 and 2 show a first embodiment of a plasticizing unit according to the invention, FIGS. 5 and 6 show a third embodiment of a plasticizing unit according to the invention, FIGS. 7 through 9 illustrate a backflushing cycle of a plasticizing unit according to FIGS. 5 and 6, FIG. 10 shows a fourth embodiment of a plasticizing unit according to the invention.

DETAILED DESCRIPTION OF THE INVENTION

Figure 4:
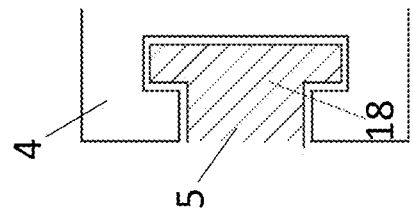
FIG. 4 shows a connection element between plasticizing screw and backflow barrier.

FIGS. 1 and 2 show a first embodiment of a plasticizing unit 1 according to the invention, which has an injection cylinder 3.

An axially movable plasticizing screw (not represented in FIGS. 1 and 2 for reasons of clarity) and a backflow barrier 5 connected to the plasticizing screw 4 are provided in the injection cylinder 3.

In this embodiment, the backflow barrier 5 is screwed to the plasticizing screw 4 in a movement-locking manner via the connection element 18.

FIG. 1 shows a metered state of the plasticizing unit 1, in which the backflow barrier 5 with the plasticizing screw connected thereto is positioned in a pulled-back state, wherein a melt cushion consisting of plasticized material is present in the injection cylinder 3 between backflow barrier 5 and injection nozzle of the injection cylinder 3.

FIG. 2 shows an injected state of the plasticizing unit 1, in which the plasticizing screw 4 with the backflow barrier 5 has been moved forwards in order to push the melt cushion out via the injection nozzle of the injection cylinder 3.

The backflow barrier 5 of this embodiment is formed here via the sealing body 14 (a ball) and is also known as a ball-type backflow barrier 5 in the state of the art.

Thus—if plasticized material is conveyed in the direction of the backflow barrier 5 by the plasticizing screw 4—the plasticized material is conveyed via the inlet channels 13 of the backflow barrier 5 in the direction of the sealing body 14. The sealing body 14 is pushed into a forward position by the plasticized material and clears a path in the direction of the space in front of the screw 17, wherein the plasticized material flows further via the outlet channels 15 of the backflow barrier 5.

In this embodiment, a filter device 6 is provided downstream of the backflow barrier 5 in a flow direction of the plasticized material. In other words, the backflow barrier 5 has a first axial end closest to the plasticizing screw 4 (the backflow barrier being connected to the plasticizing screw 4 by the connection element 18), and has a second axial end farthest from the plasticizing screw 4 and at which the filter device 6 is located. In this embodiment, this filter device 6 is connected to the backflow barrier 5 in a movement-locking manner.

To be precise, in this embodiment, the carrier 8 of the filter device 6 is connected to the backflow barrier 5 via a press fit.

Alternatively or additionally, the filter device 6 with its carrier 8 is connected to the backflow barrier 5 in a material-bonding manner or by a thread.

Thus, in this embodiment, the plasticized material conveyed via the outlet channels 15 of the backflow barrier 5 is supplied to the inlet channels 19 of the filter device 6. The carrier 8 is formed such that the plasticized material is guided radially with respect to a longitudinal axis 12 of the injection cylinder 3 from the inlet channels 19 to the outlet channels 16 via filter elements 7.

In this embodiment, these filter elements 7 are implemented by holes which have a size such that the plasticized material can pass through the holes of the filter elements 7, but contaminants are collected on the holes.

After the filtration of the plasticized material through the filter elements 7, the plasticized material is supplied to the space in front of the screw 17 via the outlet channels 16 of the filter device 6.

The filtered, plasticized material accumulates in the space in front of the screw 17 and pushes the filter device 6, together with the backflow barrier 5 and the plasticizing screw 4, back into a side (an axial end) facing away from the injection nozzle.

This process (the metering) is continued until a desired mass of plasticized material is achieved in the space in front of the screw 17. If this desired mass of plasticized material is achieved in the space in front of the screw 17, the plasticizing via the plasticizing screw 4 is ended by stopping a rotational movement of the plasticizing screw 4.

An injection movement is then carried out via the plasticizing screw 4, in order to push the filtered, plasticized material collected in the space in front of the screw 17 out via the injection nozzle of the injection cylinder 3.

For this, the plasticizing screw is moved along the longitudinal axis 12 in the direction of the injection nozzle by a linear drive, as a result of which due to the plasticized material flowing back, the sealing body 14 of the backflow barrier 5 moves into a blocking state and prevents the plasticized material from flowing back out of the space in front of the screw 17. Therefore, a pressure can be exerted on the plasticized material present in the space in front of the screw 17, and this plasticized material can thus be pushed out of the space in front of the screw 17 via the injection nozzle.

After several plasticizing and injection cycles of the plasticizing unit 1, a greater filter blocking or filter coating of the filter device 6 can occur, as a result of which a filtration of the plasticized material by the filter elements 7 is only possible to a limited extent.

In order to be able to clean the filter device 6, the injection cylinder 3 is equipped with an outlet opening 9 and a shut-off valve 10 provided in the outlet opening 9.

Thus, to clean the filter device 6, plasticized material can first be conveyed via the plasticizing screw 4, the backflow barrier 5 and the filter device 6 into the space in front of the screw 17.

For example, an injection nozzle of the injection cylinder 3 is closed or kept closed. Alternatively or additionally, a solidified sprue and/or check valves in a hot runner system or a flange/channel system provided separately for this could also be used for this purpose.

The outlet opening 9 is then opened via the shut-off valve 10 and a pressure is exerted on the plasticized material present in the space in front of the screw 17 via the plasticizing screw 4 and the backflow barrier 5.

As a result, the plasticized material flows back out of the space in front of the screw 17 through the filter elements 7 to the backflow barrier 5, which however closes because of the sealing body 14. Nevertheless, in order to be able to reduce the pressure, the plasticized material flows out of the injection cylinder 3 via the outlet opening 9, as a result of which the contaminants on the filter element 7 are detached and, carried by the plasticized material, can be removed from the injection cylinder 3.

Figure 3:
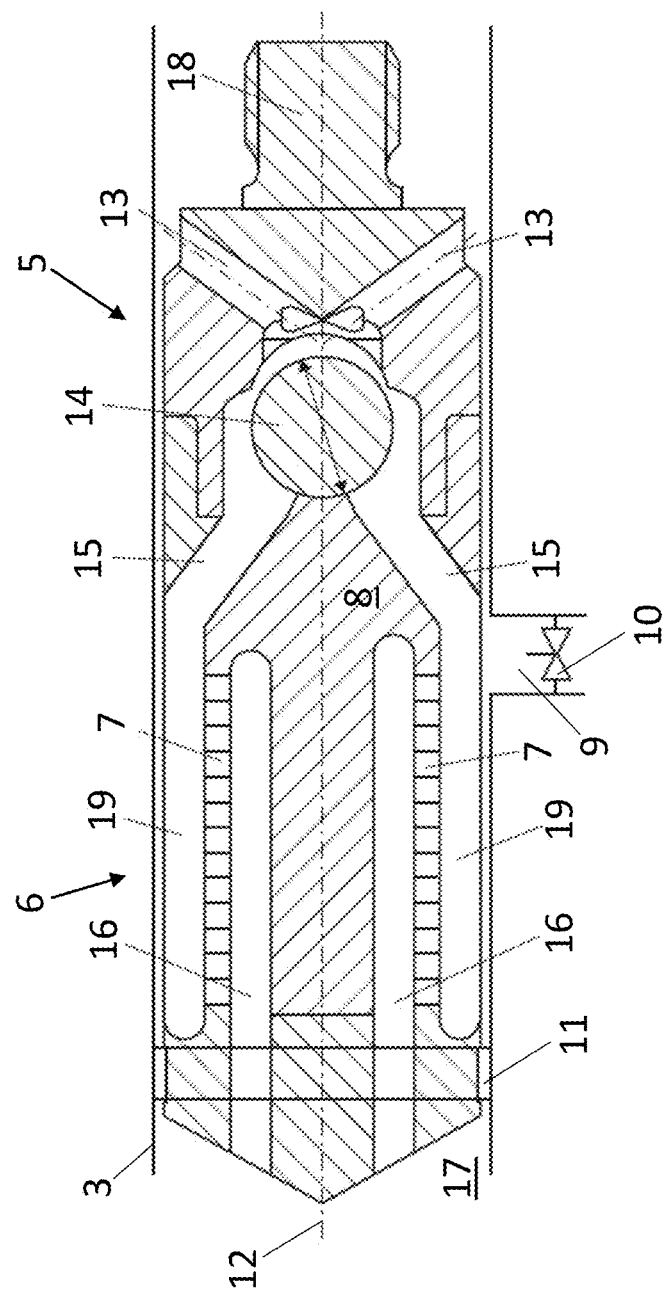
FIG. 3 shows a second embodiment of a plasticizing unit according to the invention.

FIG. 3 shows a further embodiment of a plasticizing unit 1 according to the invention which, unlike the embodiment of FIGS. 1 and 2, additionally has a sealing element 11.

This sealing element 11 is provided by a sealing ring which is placed against the carrier 8 of the filter device 6 along the circumference and adopts a position between the circumference of the filter device 6 and the inner wall of the injection cylinder 3.

Due to a design of the filter element 7 with respect to the filter device 6 and the injection cylinder 3 which is dimensioned such that only a very small gap remains between injection cylinder 3 and sealing element 11, as well as sealing element 11 and filter device 6, through which gap the plasticized material cannot pass, the filter device 6 is sealed with respect to the injection cylinder 3.

FIG. 4 shows an alternative embodiment of a connection element 18 which is formed to connect the backflow barrier 5 to the plasticizing screw 4. Via a positive-locking design, the backflow barrier 5 is mounted with respect to the plasticizing screw 4 in such a way that the backflow barrier 5 is connected linearly and in a movement-locking manner along the longitudinal axis 12 of the injection cylinder 3, but a rotational movement of the plasticizing screw 4 is not transmitted to the backflow barrier 5.

FIGS. 5 and 6 show a third embodiment of a plasticizing unit 1 according to the invention. In this embodiment, a plasticizing screw 4 is again mounted axially in an injection cylinder 3 along a longitudinal extent of the injection cylinder 3, and can be driven rotationally.

In the rear area, a material to be plasticized can be plasticized via the plasticizing screw 4 utilizing shearing, shear heat and optionally externally introduced heat. The plasticized material is then supplied to the filter device 6 via the inlet channel 13 of the backflow barrier 5 and the sealing body 14.

The filter device 6 of this embodiment is carried by a screw extension of the plasticizing screw 4. The carrier 8 of the filter device 6 in turn carries the filter element 7 and diverts the plasticized material in such a way that the filter element 7—precisely: a filter ring 7—is run through in a radial direction relative to the longitudinal axis 12.

After running through the filter element 7 of the filter device 6, the plasticized material is supplied to the space in front of the screw 17 along the longitudinal axis 12 via the screw tip 20.

The carrier 8 has grooves in a radial direction in an area of the outlet opening 9 of the injection cylinder 3 in order to connect the outlet channel 15 of the backflow barrier 5 to an inner wall of the injection cylinder 3.

A section slightly rotated about the longitudinal axis 12 of the embodiment of FIG. 5 is represented in FIG. 6, wherein a section through the grooves is chosen. This connection between inlet channel 15 of the backflow barrier 5 and the inner wall of the injection cylinder 3 becomes visible.

A process for cleaning the filter device 6 is represented in more detail in the following FIGS. 7 to 9. First of all (see FIG. 7) plasticized material is supplied to the space in front of the screw 17 via the backflow barrier 5 and the filter device 6.

Then an injection nozzle of the injection cylinder 3 is closed and an outlet opening 9 of the injection cylinder 3 is opened via a shut-off valve 10 (not represented here for reasons of clarity).

In the next step, the plasticizing screw is moved in the direction of the injection nozzle of the injection cylinder 3 in the direction of the longitudinal axis 12 of the injection cylinder 3, in order to exert a pressure on the plasticized material which is present in the space in front of the screw 17.

In response to the exerted pressure, the plasticized material flows back out of the space in front of the screw 17 via the filter element 7, as a result of which the filter element 7 is backflushed and cleaned of contaminants.

After the plasticized material has flowed back into the inlet channel 19 of the filter device 6 or the outlet channel 15 of the backflow barrier 5 and the backflow barrier 5 closes, the plasticized material, together with the backflushed contaminants, is discharged from the injection cylinder 3 via the outlet opening 9 (for this see FIGS. 8 and 9).

FIG. 10 shows a fourth embodiment of a plasticizing unit 1 according to the invention. Unlike the embodiment variants of FIGS. 5 to 9, in the embodiment of FIG. 10, the filter elements 7 of the filter device 6 do not radially enclose the plasticizing screw 4, but rather are formed in such a way that the plasticized material runs through the filter elements 7 in the direction of the longitudinal axis 12.

The remaining aspects of the embodiment variant of FIG. 10 substantially correspond to those of the embodiment variant of FIGS. 5 to 9.

Figure 11:
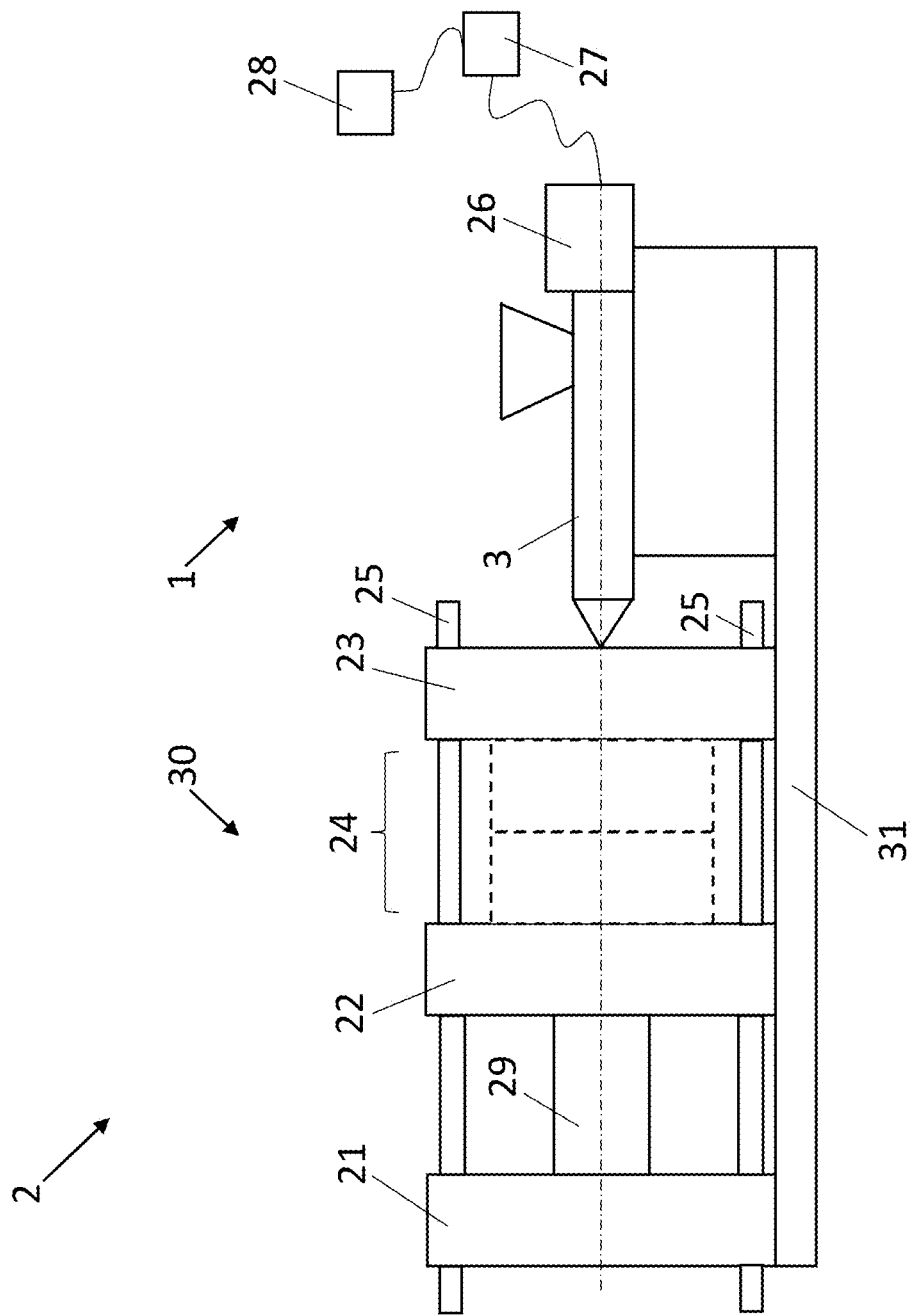
FIG. 11 shows a molding machine with a plasticizing unit.

The molding machine 2 represented by example in FIG. 11 is an injection-molding machine and has a plasticizing unit 1 and a clamping unit 30, which are arranged together on a machine frame 31. The machine frame 31 could alternatively also be formed multi-part.

The clamping unit 30 has a fixed platen 23, a movable platen 22, and an end plate 21.

The movable platen 22 is movable relative to the machine frame 23 via a symbolically represented knuckle joint mechanism 29.

Mold halves of a mold 24 can be clamped or fitted (represented dashed) on the fixed platen 23 and the movable platen 22.

The fixed platen 23, the movable platen 22 and the end plate 21 are mounted and guided relative to each other by the rails 25.

The mold 24 represented closed in FIG. 11 has at least one cavity. An injection channel, via which a plasticized material can be supplied to the plasticizing unit 1, leads to the cavity.

FIG. 11 shows a molding machine 2 with a plasticizing unit 1, wherein the plasticizing unit 1 shown in this embodiment has a plasticizing screw 4 formed as an injection screw, which is also used for injecting a material to be plasticized into the mold 24.

The plasticizing unit 1 of this embodiment has an injection cylinder 3 and a plasticizing screw 4 arranged in the injection cylinder 3. This plasticizing screw 4 is rotatable about an axis of rotation as well as movable axially along the axis of rotation in the conveying direction.

These movements are driven via a schematically represented drive unit 26. This drive unit 26 preferably comprises a rotary drive for the rotational movement and a linear drive for the axial injection movement.

The plasticizing unit 1 (and thus the injection unit) is in signaling connection with a control or regulating unit 27. Control commands are for example output to the plasticizing unit 1 and/or the drive unit 26 by the control or regulating unit (controller) 27.

The control or regulating unit 27 can be connected to an operating unit and/or a display device 28 or can be an integral constituent of such an operating unit and/or a display device 28.

LIST OF REFERENCE NUMBERS 1 plasticizing unit
2 molding machine
3 injection cylinder
4 plasticizing screw
5 backflow barrier
6 filter device
7 filter element
8 carrier
9 outlet opening
10 shut-off valve
11 sealing element
12 longitudinal axis
13 inlet channel of the backflow barrier
14 sealing body
15 outlet channel of the backflow barrier
16 outlet channel of the filter device
17 space in front of the screw
18 connection element
19 inlet channel of the filter device
20 screw tip
21 end plate
22 movable platen
23 fixed platen
24 mold
25 rail
26 drive unit
27 control or regulating unit
28 display device
29 knuckle joint mechanism
30 clamping unit
31 machine frame

The invention claimed is:

1. A plasticizing unit for use in a molding machine, the plasticizing unit comprising:
   an injection cylinder;
   an axially movable plasticizing screw arranged in the injection cylinder;
   a backflow barrier arranged in the injection cylinder, the backflow barrier having a first axial end closest to the plasticizing screw and a second axial end farthest from the plasticizing screw; and
   a filter device configured to filter plasticized material, the filter device being arranged axially movable in the injection cylinder,
   wherein the filter device is located at the second axial end of the backflow barrier farthest from the plasticizing screw.

2. The plasticizing unit according to claim 1, wherein the filter device is axially and/or rotationally coupled to the plasticizing screw and/or the backflow barrier in a movement-locking manner.

3. The plasticizing unit according to claim 1, wherein the filter device includes a filter element, at least partially surrounding the plasticizing screw and/or the backflow barrier.

4. The plasticizing unit according to claim 1, wherein the filter device is configured such that the plasticized material flows through the filter device in a radial direction with respect to a longitudinal axis of the injection cylinder.

5. The plasticizing unit according to claim 1, wherein the filter device has a carrier configured to support a filter element of the filter device, the carrier being configured to channel the plasticized material through the filter element.

6. The plasticizing unit according to claim 5, wherein the carrier is connected to the backflow barrier and/or is part of the backflow barrier.

7. The plasticizing unit according to claim 5, wherein the carrier has a first channel and a second channel, wherein the second channel lies further radially inside in the carrier than does the first channel, and the first channel communicates with the second channel via the filter element.

8. The plasticizing unit according to claim 1, wherein the injection cylinder has an outlet opening in an area of the filter device.

9. The plasticizing unit according to claim 1, further comprising a sealing element configured to seal the filter device with respect to the injection cylinder.

10. The plasticizing unit according to claim 1, wherein the filter device has a filter element having a hole and/or filter structure configured to filter the plasticized material.

11. A molding machine comprising the plasticizing unit according to claim 1.

12. A method for operating the plasticizing unit, according to claim 1, the method comprising:
   plasticizing material to form a plasticized material in the injection cylinder and
   filtering the plasticized material using the filter device arranged axially movable in the injection cylinder.

13. The plasticizing unit according to claim 3, wherein the filter element is a filter ring.

14. The plasticizing unit according to claim 1, wherein the filter device is configured such that the plasticized material flows through the filter device in an axial direction with respect to a longitudinal axis of the injection cylinder.

15. The plasticizing unit according to claim 8, wherein the outlet opening is connected to a surrounding area of the injection cylinder by a shut-off valve.

16. The molding machine according to claim 11, wherein the molding machine is an injection-molding machine.

\* \* \* \* \*